(12) United States Patent
Kayali et al.

(10) Patent No.: US 6,802,896 B2
(45) Date of Patent: Oct. 12, 2004

(54) CONCRETE AGGREGATE

(75) Inventors: Obada Kayali, Chapman (AU); Karl John Shaw, Wagga Wagga (AU)

(73) Assignee: Unisearch Limited, Sydney (AU)

( * ) Notice: Subject to any disclaimer, the term of this patent is extended or adjusted under 35 U.S.C. 154(b) by 0 days.

(21) Appl. No.: 09/996,528

(22) Filed: Nov. 28, 2001

(65) Prior Publication Data

US 2003/0047114 A1 Mar. 13, 2003

(51) Int. Cl.$^7$ .......................... C04B 14/00; C04B 18/06
(52) U.S. Cl. ...................... 106/405; 106/624; 106/700; 106/705; 106/DIG. 1
(58) Field of Search .................................. 106/405, 624, 106/700, 705, DIG. 1; 264/DIG. 1, DIG. 49

(56) References Cited

U.S. PATENT DOCUMENTS

| | | | |
|---|---|---|---|
| 2,724,656 A | | 11/1955 | Gunzelmann |
| 4,504,320 A | * | 3/1985 | Rizer et al. .................... 106/98 |
| 4,701,222 A | * | 10/1987 | Kobayashi et al. ......... 106/457 |
| 4,741,782 A | | 5/1988 | Styron |
| 4,770,831 A | * | 9/1988 | Walker ....................... 106/710 |
| 5,211,750 A | | 5/1993 | Smith |
| 5,350,549 A | | 9/1994 | Boyle |
| 5,374,307 A | | 12/1994 | Riddle |
| 5,584,895 A | | 12/1996 | Seike |
| 5,665,290 A | | 9/1997 | Koslowski |
| 5,669,969 A | * | 9/1997 | Meade et al. ................ 106/697 |
| 5,704,972 A | | 1/1998 | Ivkovich |
| 5,766,338 A | | 6/1998 | Weber |
| 6,054,074 A | | 4/2000 | Wu |
| 6,068,803 A | | 5/2000 | Weyand |
| 6,277,189 B1 | | 8/2001 | Chugh |

FOREIGN PATENT DOCUMENTS

| | | |
|---|---|---|
| CA | 2273629 | 1/2000 |
| GB | 2318115 | 4/1998 |
| GB | 2330138 | 4/1999 |
| IL | 98-148153/14 | 2/1998 |
| JP | 80724C/46 | 11/1980 |
| JP | 30444K/13 | 2/1983 |
| JP | 84-197622/32 | 6/1984 |
| JP | 7-206491 | 8/1985 |
| JP | 84-24958/38 | 8/1986 |
| JP | 89-237632/33 | 7/1989 |
| JP | 98-280314/25 | 4/1998 |
| JP | 98-514998/44 | 8/1998 |
| JP | 99-258722/22 | 3/1999 |
| JP | 2000-142344/13 | 1/2000 |
| JP | 2000-313679 | 11/2000 |
| JP | 2001-544329/61 | 6/2001 |
| NL | 84-034686/06 | 1/1984 |

* cited by examiner

Primary Examiner—C. Melissa Koslow
Assistant Examiner—Shalie Manlove
(74) Attorney, Agent, or Firm—Kelly Bauersfeld Lowry & Kelley, LLP

(57) ABSTRACT

The present invention relates generally to a method of forming a lightweight fly ash aggregate together with the resultant fly ash aggregate. The invention further relates to various aspects of the method of forming the lightweight fly ash aggregate including methods of forming fly ash slurry, briquettes, or lightweight fly ash particles. The general steps involved in forming a lightweight fly ash aggregate are as follows:

I. blending fly ash together with a plasticiser and a reduced quantity of water;

II. compacting or compressing the resultant fly ash slurry or dough;

III. cutting or otherwise forming the dough into briquettes;

IV. heating the briquettes to effectively cure the dough;

V. firing the briquettes to sinter the fly ash;

VI. crushing the sintered briquettes and sizing, preferably screening, the resultant fly ash particles to provide the lightweight fly ash aggregate of a predetermined size range.

23 Claims, 10 Drawing Sheets

(10 of 10 Drawing Sheet(s) Filed in Color)

CONCRETE AGGREGATE

FIELD OF THE INVENTION

The present invention relates generally to a method of forming a lightweight fly ash aggregate together with the resultant fly ash aggregate. The invention further relates to various aspects of the method of forming the lightweight fly ash aggregate including methods of forming fly ash slurry, briquettes, or lightweight fly ash particles.

BACKGROUND OF THE INVENTION

Sintered pelletised fly ash aggregates have been commercially produced in several industrialised countries such as the UK, USA, Japan, India and North Europe. The manufacturing process of these aggregates requires pelletising a mixture of the fly ash and water before sintering the pellets at temperatures above 1200° C. This process produces light spherical aggregate with a high proportion of voids. The manufacture of sintered pelletised aggregate from fly ash requires a high degree of control during the production processes. The experience of the present applicants with this type of lightweight aggregate has been with the UK produced aggregate that is called LYTAG. This experience has shown large variations in the size and quality of the aggregate. Such variations have resulted, as expected, in inconsistency with the final product, namely the concrete. Since it is structural concrete that is ultimately the subject of interest, it is imperative that the produced aggregate should be of high quality and consistent characteristics. This is particularly the case when such aggregates are to be used in important structures such as off-shore platforms.

In Australia, there is no production of fly ash aggregates by any method. This is in spite of the fact that most of the power industry in this country is from coal sources, and that fly ash itself is produced abundantly. Investigations have been conducted using the LYTAG sintered pelletised fly ash in high-strength concrete production and it was capable of producing concrete with compressive strength of 70 MPa. Nevertheless, consistency and repeatability of the strength values and workability levels, even under the strictest laboratory conditions were not high. The reason for this drawback was the inconsistency in the lightweight aggregate that was used. The inconsistency was manifested mainly in the water absorption capacity, hardness, and size distribution. Moreover, producing high strength lightweight concrete required a very large quantity of ordinary portland cement. This should be discouraged as much as possible because cement manufacture is an industry that causes significant damage to the environment through its very high demand of energy and its emission of very large amounts of carbon dioxide. Thus, it was previously understood that in order to produce high performance concrete from LYTAG, a substantial amount of cement must be used. This is quite defeating to at least the environmental reasons for which the lightweight aggregate concrete was originally envisaged.

SUMMARY OF THE INVENTION

According to one aspect of the present invention there is provided a method of forming a lightweight fly ash aggregate, said method comprising the steps of:

blending fly ash together with a plasticiser and a reduced quantity of water to produce a fly ash slurry;

heating the fly ash slurry to effectively dry the slurry from which a fly ash briquette is derived; and crushing the fly ash briquette to provide the lightweight fly ash aggregate.

Preferably the method further comprises the step of sizing the fly ash aggregate according to a predetermined particle size range.

According to another aspect of the present invention there is provided a method of forming a fly ash slurry, said method comprising blending fly ash together with a plasticiser and a reduced quantity of water to produce the fly ash slurry.

Preferably the plasticiser is a superplasticiser.

Preferably the volume (1) of the plasticiser to the weight (kg) of the fly ash is between about 0.1 to 5%. More preferably the reduced volumetric quantity (1) of water to the weight (kg) of the fly ash is less than about 35%.

According to yet another aspect of the invention there is provided a method of forming a fly ash briquette, said method comprising the steps of:

heating a fly ash slurry at between about 40 to 110° C. to effectively cure the slurry from which the fly ash briquette is derived; and firing the fly ash briquette at around 1300° C.

Preferably the curing of the slurry is effected at a controlled level of humidity, for example at approximately 37% relative humidity. More preferably the slurry is cured for an extended period of between about one (1) to four (4) days.

Generally the method also comprises the step of compacting or compressing the slurry prior to curing.

According to a further aspect of the invention there is provided a method of forming lightweight fly ash particles, said method comprising crushing a fly ash briquette to provide the lightweight fly ash particles.

Generally the step of crushing the fly ash briquette provides said fly ash particles having irregular or angular shapes. It is understood that the irregular or angular shapes of the fly ash aggregate improves its interlocking with the mortar-paste matrix of concrete and thus the strength of the concrete.

Preferably the method further comprises the step of sizing the fly ash particles according to a predetermined particle size range. More preferably the sizing is effected by screening of the fly ash particles. Generally the predetermined particle size range covers fly ash particles of a size from between about 75 $\mu$m to 30 mm.

According to yet a further aspect of the invention there is provided a lightweight fly ash aggregate for concrete production, said aggregate being of a relatively low water absorption capacity.

Preferably the relatively low absorption capacity as measured over 24 hours is less than 10%. More preferably the absorption capacity is between 2 to 5%.

Preferably the lightweight fly ash aggregate is of a predetermined particle size range. More preferably the predetermined particle size range covers fly ash particles of a size from about 75 $\mu$m to 30 mm. Generally the particle size range is between 0.075 mm (75 $\mu$m) to 12 mm.

BRIEF DESCRIPTION OF THE PHOTOGRAPHS

The patent or application file contains at least one drawing executed in color. Copies of this patent or patent application publication with color drawing(s) will be provided by the U.S. Patent and Trademark Office upon request and payment of the necessary fee.

In order to achieve a better understanding of the nature of the present invention FIGS. 1 to 10 are provided.

DETAILED DESCRIPTION OF THE PREFERRED EMBODIMENTS

Figure 1:
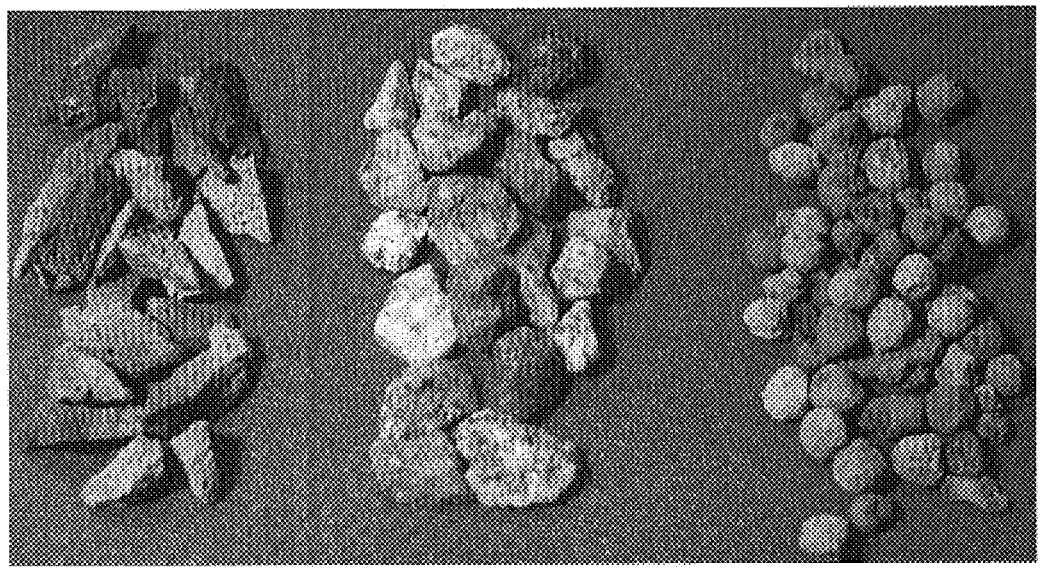
FIG. 1 is a photograph of fly ash aggregate of the present invention (left hand side), normal weight natural granite aggregate (in the middle) and prior art fly ash LYTAG aggregate (right hand side).

In order to achieve a better understanding of the nature of the present invention a preferred embodiment of a method of forming a lightweight fly ash aggregate together with the resultant fly ash aggregate itself will now be explained.

The following exemplary experiments are relevant to the general methodology of forming a lightweight fly ash aggregate by:

I. blending fly ash together with a plasticiser and a reduced quantity of water;

II. compacting or compressing the resultant fly ash slurry or dough;

III. cutting or otherwise forming the dough into briquettes;

IV. heating the briquettes to effectively cure the dough;

V. firing the briquettes to sinter the fly ash;

VI. crushing the sintered briquettes and sizing, preferably screening, the resultant fly ash particles to provide the lightweight fly ash aggregate of a predetermined size range.

Blending and Placing Procedure

Fly ash was weighed and placed in a suitable concrete mixer or similar. About seventy percent of the total amount of water was then added and the slurry mixture blended and rotated for three minutes. The fly ash used in this experiment was a Class F fly ash conforming to ASTM standard. This is available in abundance from power stations that use coal. The fly ash that was used in this example was from Eraring, Australia. However, it will be appreciated that the use of a particular fly ash is not a necessity although it should conform to a local quality standard.

A plasticiser, in this example a superplasticiser, was then added and mixing continued for another period of three minutes. The superplasticiser was used in order to facilitate the workability of the fly ash slurry or dough. The super-plasticiser was a pure sodium salt of a polynapthalene sulphonate made by Handy Chemicals and commercially available under the trade name DISAL. However, it will be apparent that the use of a particular plasticiser is not necessary. It is only important to achieve consistent workability with minimum amount of water, and the use of a suitable plasticiser should be satisfactory provided the dosage is relevant to the particular superplasticiser that is used. In this case, where DISAL was the superplasticiser, the dosage was at the rate of 200 ml per 100 kg of fly ash.

The rest of the water was then added and the mixing was continued for three more minutes when the mixing was complete. The fly ash dough was then placed into a tray and compacted or vibrated on a vibrating table in a similar manner to concrete placing. The compaction or compression was stopped when the dough mixture started to bleed. The dough was then cut into briquettes by cutter moulds forced into the settled and compacted dough, and the briquettes removed from the tray. It is the applicants intention for large scale production to adopt methods usually employed for the production of clay bricks including the compaction and extrusion and then the cutting of the fly ash briquettes.

In this example for every 100 kg of fly ash the proportions of the constituents were:

I. water 26 liters; and

II. superplasticiser 200 ml.

Heat Treatment

The dough briquettes were then placed in a controlled curing chamber at 50° C. and 37% relative humidity for a period of 48 hours. The curing process is designed to give the dough the required stability and robustness. After the completion of this period the cured samples were placed in a kiln and the temperature was raised to 1300° C. within a period of nine hours. The temperature was kept at 1300° C. for a further four hour period. The kiln was then switched off and the samples were left to cool down slowly for a period of 48 hours before retrieving the sintered briquettes. The firing temperature of around 1300° C. is sufficiently high to achieve sintering whilst avoiding glazing of the fly ash.

Crushing and Sizing

The sintered briquettes were then introduced into a crusher. The maximum fly ash particle size that the applicants found in this example to produce best results was 12 mm. The aggregates were therefore crushed to produce this maximum aggregate size. The crushed aggregates were then sized into the following size categories:

I. coarse aggregate of 12 mm maximum size and 4.75 mm minimum size;

II. fine aggregate with maximum size passing the 4.75 mm sieve and minimum size 75 µm; and III. ultra fines which are smaller than 75 µm (passing the No. 200 ASTM sieve size).

The crushed and sized classified fly ash aggregates that were the subject of this application were the coarse and fine aggregates. That is, the predetermined and selected size range was from 75 µm to 12 mm.

Table 1 shows the particle size distribution.

TABLE 1

Sieve analysis of the fly ash aggregate of one example of the invention

| Sieve size | Mass retained g | Percentage retained | Cumulative percentage retained | Cumulative percentage passing |
| --- | --- | --- | --- | --- |
| 13.20 mm | 0 | 0 | 0 | 100 |
| 9.50 mm | 371.8 | 18.6 | 18.6 | 81.4 |
| 6.70 mm | 392.5 | 19.6 | 38.2 | 61.8 |
| 4.75 mm | 222.1 | 11.1 | 49.3 | 50.7 |
| 2.36 mm | 387.5 | 19.4 | 68.7 | 31.3 |

TABLE 1-continued

Sieve analysis of the fly ash aggregate of one example of the invention

| Sieve size | Mass retained g | Percentage retained | Cumulative percentage retained | Cumulative percentage passing |
|---|---|---|---|---|
| 1.70 mm | 97.9 | 4.9 | 73.6 | 26.4 |
| 1.18 mm | 109.1 | 5.5 | 79.1 | 20.9 |
| 4.25 μm | 170.8 | 8.6 | 87.7 | 12.3 |
| 300 μm | 45.8 | 2.3 | 90 | 10 |
| 150 μm | 76.7 | 3.8 | 93.8 | 6.2 |
| <150 μm | 123.0 | — | — | |
| Total | 1997.2 | 100 | | |

The purpose of producing the fly ash aggregates was to use it in the production of concrete. Accordingly, the characteristics relevant to concrete making are those that the applicants determined. These characteristics include: particle size distribution, aggregate crushing value, apparent saturated surface dry specific gravity, dry rodded bulk density and water absorption capacity. The characterisation testing was done according to the AS 2758.1 and AS 1141.

Table 2 shows the results of the tests to determine these other relevant characteristics.

TABLE 2

Characteristics of the fly ash aggregate of this example of the invention

| Property | Value |
|---|---|
| Apparent specific gravity based on saturated and surface dry condition | 1.685 |
| Apparent specific gravity based on oven dry condition | 1.61 |
| Dry rodded bulk density | 848 kg/m$^3$ |
| Crushing value | 28% |
| Absorption capacity (in 24 hours) | 3.4% |

Table 3 lists the properties of the prior art LYTAG, and the traditional granite and Dacite aggregates. The Granite and Dacite aggregates are natural aggregates commonly used universally for concrete production. On the other hand, the LYTAG aggregate is the sintered pelletised fly ash aggregate described in the admitted prior art and having been a successful commercial lightweight aggregate outside Australia since 1966.

A comparison between the properties of the fly ash aggregate in this example of the invention shown in Table 2 and those prior art aggregates shown in Table 3, indicates that the fly ash aggregate of the embodiment of the invention has a significantly lower absorption capacity than LYTAG. Moreover, the crushing value of the described embodiment was significantly less than that of LYTAG. Thus it is expected that the fly ash aggregate in accordance with the described embodiment of the invention may produce concretes that are more durable and stronger than LYTAG concretes and at the same time have comparable and more stable weight than LYTAG.

In order to demonstrate the suitability and applicability of the fly ash aggregate to its application in concrete, a concrete mixture was designed and tested for the fresh and hardened concrete. The mixture design in this example is shown in Table 4 which shows the proportions based on saturated and surface dry conditions of the aggregates. It also shows the mixture design for the three types of concrete made for this example so that a direct comparison may be made between concretes from the three aggregates. The design was performed so that the three concretes would possess the same cement content and the same content of any pozzolanic materials that may be producing a cementitious effect. The amount of water was designed so as to achieve about the same workability as measured by the well known slump test. The density of the fresh and compacted concrete was measured for the three types and the values are reported in Table 5.

TABLE 4

Concrete Mixture Design (Saturated and Surface Dry Condition) for the Three Types of Aggregates

| | | Granite | LYTAG | Fly ash aggregate of the invention |
|---|---|---|---|---|
| Cement | Kg | 300 | 300 | 300 |
| Silica Fume | Kg | 40 | 40 | 40 |
| Water | Liters | 172 | 150 | 193 |
| Water reducing agent | Liters | 0.49 | 0.49 | 0.49 |
| Superplasticiser | Liters | 1.95 | 1.49 | 1.95 |
| Natural coarse aggregate | Kg | 1001 | 0 | 0 |
| Natural fine aggregate | Kg | 288 | 0 | 0 |
| 12 mm LYTAG | Kg | 0 | 293 | 0 |
| 6 mm LYTAG | Kg | 0 | 289 | 0 |
| 3 mm LYTAG | Kg | 0 | 316 | 0 |
| LYTAG fines | Kg | 0 | 233 | 0 |
| Coarse fly ash aggregate | Kg | 0 | 0 | 255 |

TABLE 3

Properties of the prior art of LYTAG and traditional granite and Dacite aggregates

| Property | LYTAG | Granite | Dacite |
|---|---|---|---|
| Apparent specific gravity based on saturated surface dry condition | 1.72 | 2.77 | 2.51 |
| Apparent specific gravity based on oven dry condition | 1.4 | 2.74 | 2.50 |
| Dry rodded bulk density | 831 kg/m$^3$ | 1478 kg/m$^3$ | 1449 kg/m$^3$ |
| Crushing value | 35% | 16.9% | 15.5% |
| Absorption capacity (in 24 hours) for 12 mm coarse | 8.5% | 0.8% | 0.54% |
| Absorption capacity (in 24 hours) for 6 mm coarse | 8.5% | — | — |
| Absorption capacity (in 24 hours) for 3 mm coarse | 8.5% | — | — |
| Absorption capacity (in 24 hours) for the fines | 10.7% | 2.7% | 2.7% |

TABLE 4-continued

Concrete Mixture Design (Saturated and Surface Dry Condition) for the Three Types of Aggregates

|  |  | Granite | LYTAG | Fly ash aggregate of the invention |
|---|---|---|---|---|
| of the invention 12 mm Coarse fly ash aggregate of the invention 6 mm | Kg | 0 | 0 | 255 |
| Coarse fly ash aggregate of the invention 3 mm | Kg | 0 | 0 | 256 |
| Fines - fly ash aggregate of the invention | Kg | 0 | 0 | 162 |
| Fly ash | Kg | 300 | 300 | 300 |
| Water/cement ratio | Kg | 0.57 | 0.5 | 0.64 |

The three types of concrete had very similar work ability conditions and the slump was very low for the three types. The three types, however, were workable and easily compactable and did not exhibit segregation or bleeding. The hardened concretes were tested at the ages of 7 and 28 days the results are recorded in Table 5. The compressive strength only was determined at 7 days as well as at 28 days. It is clearly apparent that the value of the compressive strength of the concrete from the fly ash aggregate of the invention is substantially higher than the corresponding mix made from the LYTAG lightweight aggregate. Significantly the strength of the concrete from the fly ash aggregate of the invention at this early age is higher than the strength of the normal weight aggregate concrete made with granite aggregates. This is in spite of the fact that the granite aggregate concrete is 24% heavier than the concrete from the fly ash aggregate of the invention. Moreover, the apparent porosity, which is indicative of surface permeability, is much lower in the concrete from the fly ash aggregate of the invention than in both LYTAG and granite concretes. This characteristic indicates that the concrete from the fly ash aggregate of the invention is probably resistant to adverse environmental conditions than the previously known fly ash based LYTAG concrete and the normal weight granite concrete.

The compressive strength and modulus of elasticity values were also determined at the age of 28 days. The 28 day compressive strength of the concrete from the fly ash aggregate of the invention was 62.9 MPa, which is comfortably classified as high strength concrete. The compressive strength recorded for LYTAG concrete was 44.6 MPa, and the value for the normal weight granite concrete was 56.3 MPa. Thus, the concrete from the fly ash aggregate of the invention is clearly and consistently superior to both other types of concretes in its compressive strength.

TABLE 5

Properties of Fresh and Hardened Concretes from the Three Types of Aggregates in this example

| Property | Granite concrete | LYTAG concrete | Concrete from the fly ash aggregate of the invention |
|---|---|---|---|
| Slump | 3 mm | 3 mm | 2 mm |
| Fresh density, kg/m³ | 2232 | 1722 | 1800 |
| Air dry density, kg/m³ | 2180 | 1602 | 1780 |
| Oven dry density, kg/m³ | 2134 | 1540 | 1747 |
| Apparent porosity | 4.5% | 13.3% | 3.1% |
| 7 day compressive strength, MPa | 36.3 | 28.4 | 38.8 |
| 28 day compressive strength, MPa | 56.3 | 44.6 | 62.9 |
| 28 day modulus of elasticity, GPa | 32.5 | 16.7 | 23.7 |

The applicants also measured the modulus of elasticity by the method of strain controlled loading. This method provided the full stress-strain history of the tested sample and thus it also provides a means of evaluating the fracture toughness of the material. The results showed that the modulus of elasticity value for the concrete from the fly ash aggregate of the invention is 23.7 GPa while that for LYTAG is 16.7 GPa and for granite aggregate concrete is 32.5 GPa. It was expected that the lightweight concretes would possess a lower value of elasticity modulus. This is because the modulus of elasticity depends primarily on that of the aggregates. However, the concrete from the fly ash aggregate of the invention had a significantly higher modulus of elasticity than LYTAG concrete and indicates the higher stiffness of the aggregate of the invention when compared to LYTAG. The value of the elastic modulus of the concrete from the fly ash aggregate of the invention was expectedly lower than that of normal weight granite concrete. This is by no means an undesirable characteristic because a lower E value allows larger deflections in the case of vibrations or earthquakes occurrences, thus providing more ductility to the structure. On the other hand, this value should not be too low as to cause very large deflections in normal service conditions. The value recorded for the concrete is in between that of LYTAG and granite concretes. Thus it is indicative of better serviceability than a LYTAG concrete structure and enhanced ductility over a similar structure made from granite concrete.

Further trials were conducted but with an unclassified (that is being collected directly from the hoppers without further sizing) class F fly ash taken direct from collectors or hoppers at a power station. This was different from the class F fly ash of the previous example which had been processed and conformed with the ASTM standard. Furthermore, in these additional trials the unclassified class F fly ash was blended together with a polymeric superplasticiser made by Grace Chemical and commercially available in Australia under the trade name DARACEM. Otherwise, the process steps and formulation for producing the fly ash aggregate of this trial was substantially in line with the preceding example.

Table 6 shows the results of the tests to determine the corresponding relevant characteristics of this alternative fly ash aggregate of the present invention.

TABLE 6

Characteristics of the other fly ash aggregate of the invention

| Property | Value |
|---|---|
| Apparent specific gravity based on saturated surface dry condition | 1.59 |
| Apparent specific gravity based on oven dry condition | 1.55 |

TABLE 6-continued

Characteristics of the other fly ash aggregate of the invention

| Property | Value |
|---|---|
| Dry rodded bulk density | 862 kg/m³ |
| Crushing value | 26% |
| Absorption capacity (in 24 hours) | 2.36% |

Table 7 includes the results pertaining to a concrete mixture produced from the other fly ash aggregate of these further trials. This comparative table shows the mixture design for the four types of concrete made for this study so that a direct comparison can be made between concretes from the various aggregates. The design was set up so that all concretes had the same cement content and amount of water. The density of the fresh and compacted concrete was measured for the four types and the values are reported in Table 8. Furthermore, the processes of weighing, mixing, curing, testing and reporting were all performed by an independent engineering firm. The firm is accredited by NATA (National Association of Testing Authorities, Australia) to perform such operations. The firm is Canberra Testing Service, a subsidiary of Coffey Geosciences Pty Ltd. All operations were conducted according to the relevant Australian standards.

TABLE 7

Concrete Mixture Design (Saturated and Surface Dry Condition) for the Four Types of Aggregates of this second example

| | | Granite | LYTAG | Dacite | Other fly ash aggregate of the invention |
|---|---|---|---|---|---|
| Cement | kg | 370 | 370 | 370 | 370 |
| Silica Fume | kg | 56.92 | 56.92 | 56.92 | 56.92 |
| Water | Liters | 207.2 | 207.2 | 207.2 | 207.2 |
| Water reducing agent | Liters | 2.96 | 2.96 | 2.96 | 2.96 |
| Superplasticiser | Liters | 1.43 | 2.85 | 0.71 | 0.00 |
| Natural coarse aggregate | kg | 893.7 | — | 820 | — |
| Natural fine aggregate | kg | 626.3 | — | 626.3 | — |
| LYTAG coarse 12 mm to 3 mm | kg | — | 481.4 | — | — |
| LYTAG fines | kg | — | 475.5 | — | — |
| Coarse fly ash aggregate of the invention | kg | — | — | — | 440.4 |
| Fines of fly ash aggregate of the invention | kg | — | — | — | 510.6 |
| Fly ash | kg | 142.3 | 142.3 | 142.3 | 142.3 |
| Water/cement ratio | 0.56 | 0.56 | 0.56 | 0.56 | 0.56 |
| Water/cementitious materials ratio | 0.36 | 0.36 | 0.36 | 0.36 | 0.36 |

The hardened concretes were tested at the ages of 7 and 28 days for compressive strength, and 28 and 35 days for indirect tensile strength and modulus of elasticity, respectively. It is clear from the results of Table 8 that the compressive strength of the concrete from the fly ash aggregate of this embodiment of the invention is higher than the corresponding mix made from the prior art aggregates surprisingly and significantly including the granite and Dacite aggregates. The concrete from the fly ash aggregate of this invention is 27% lighter than the granite aggregate concrete.

TABLE 8

Properties of Fresh and Hardened Concretes from the Four Types of Aggregates Series No. 2 (mixed, executed and independently tested)

| Property | Granite Concrete | Dacite Concrete | LYTAG Concrete | Concrete from the other fly ash aggregate of the invention |
|---|---|---|---|---|
| Slump mm | 75 | 75 | 85 | 85 |
| Measured air content % | 2 | 2.1 | 6.2 | 3.8 |
| Fresh density, kg/m³ | 2260 | 2280 | 1770 | 1780 |
| S.S. Dry density, at 28 days, kg/m³ | 2285 | 2290 | 1818 | 1815 |
| 7 day compressive strength, MPa | 38.6 | 37.4 | 34.6 | 40.75 |
| 28 day compressive strength, MPa | 58.25 | 55.5 | 53.4 | 66.75 |
| 28 day indirect tensile strength, MPa | 3.55 | 3.45 | 3.70 | 3.75 |
| 35 day modulus of elasticity, GPa | 32.5 | 31.5 | 19.0 | 25.5 |

The compressive strength for the concrete from the fly ash aggregate was significantly higher than the compressive strength of all the other concretes and at all the ages of the tests. The 28 day compressive strength of the fly ash aggregate concrete, the subject of this invention, is 14.6%, 20% and 25% higher than the 28 day compressive strength of the Granite, Dacite, and the prior art LYTAG concretes respectively. This is in spite of the fact that the cement content, the cementitious materials content, and the water content are the same for all these concretes. Also it follows that the water to cement ratio and the ratio between the water and the total cementitious materials is exactly the same for all these concretes. Moreover, the workability characteristics of the four concretes were similar, and all were highly workable to the same extent.

The modulus of elasticity for the concrete from the fly ash aggregate was lower than that of the granite aggregate and Dacite concretes. However, the concrete from the fly ash aggregate of the invention had a significantly higher modulus of elasticity than LYTAG concrete. The lower modulus of elasticity, as compared to granite or Dacite concrete, allows larger deflections in the case of vibrations or earthquake occurrences and shows enhanced ductility over a similar structure made from granite or Dacite concrete. On the other hand, the modulus of elasticity is not too low as to cause large deflections in normal service conditions and as such offers better serviceability than the LYTAG concrete. The indirect tensile strength of concrete from the fly ash aggregate of the invention is also slightly higher than and superior to both the granite and LYTAG concrete.

Table 9 includes the results of shrinkage properties for concrete from prior art aggregate and aggregate obtained from the further trials of the invention. The shrinkage results are particularly favourable insofar as the fly ash aggregate exhibited lower shrinkage, for example 44% less than granite concrete after 56 days. The shrinkage value of the fly ash aggregate of the invention is also 49% and 51% less than the shrinkage value of the natural Dacite aggregate concrete and the prior art LYTAG concrete respectively. This particularly low shrinkage will result in a low degree of cracking in the resultant concrete and is of great advantage in the performance of concrete structures and concrete roads and pavements.

TABLE 9

Shrinkage Properties of Fresh and Hardened Concretes from the Four Types of Aggregates

| Days of Drying (after 7 days of standard curing according to the Australian Standards) | Shrinkage Value (Microstrain) | | | |
| --- | --- | --- | --- | --- |
| | Granite Concrete | Dacite Concrete | LYTAG Concrete | Concrete from the other fly ash aggregate of the invention |
| 7  | 590 | 570 | 550 | 400 |
| 14 | 730 | 740 | 770 | 520 |
| 21 | 770 | 790 | 820 | 540 |
| 28 | 810 | 800 | 840 | 560 |
| 56 | 850 | 880 | 890 | 590 |

Figure 2:
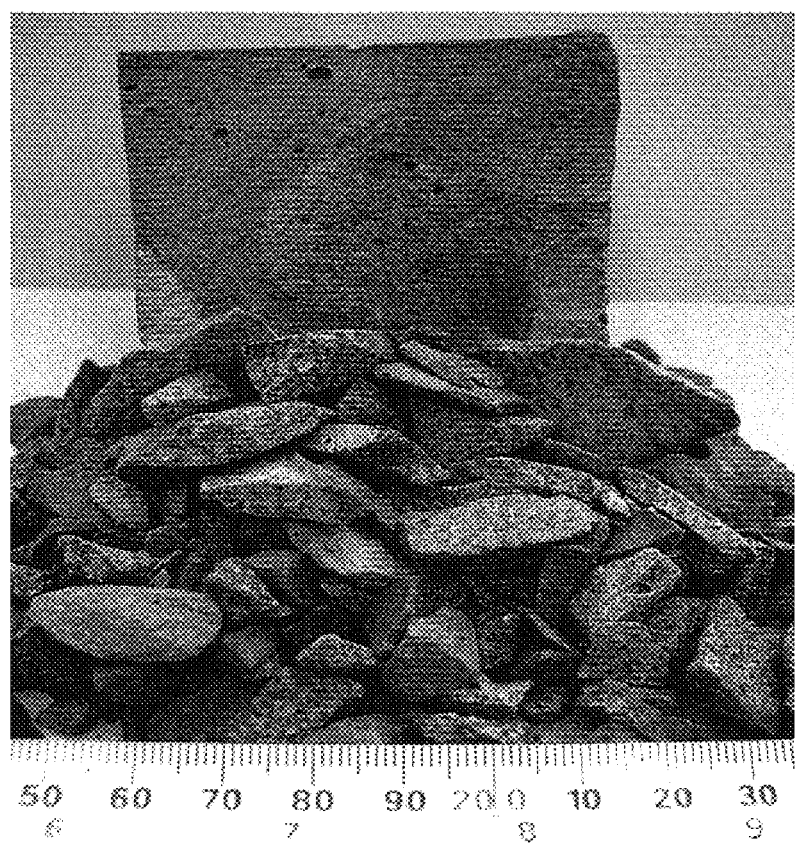
FIG. 2 is a photograph of another example of fly ash aggregate of the present invention, shown together with a fly ash briquette (after being cleaved) of the type used to produce the fly ash aggregate shown in FIG. 2.

The photograph of FIG. 1 depicts the fly ash aggregate of the present invention on the left hand side, the normal weight natural granite aggregate in the middle and the prior art fly ash LYTAG aggregate on the right hand side. This comparative photograph clearly illustrates the distinctive angularity of the fly ash aggregate of this example of the invention as compared to both of the prior art aggregates and in particular the LYTAG aggregate. This fly ash aggregate represents the coarse and fine aggregates of the previous example of Table 1. The photograph of FIG. 2 similarly shows the fly ash aggregate but of the other example of this invention together with a fly ash briquette (after being cleaved) and from which the fly ash aggregate is crushed. The photograph of FIG. 2 not only depicts the angularity of the fly ash aggregate but illustrates the surface porosity and "cratered" appearance of the aggregate.

Figure 3:
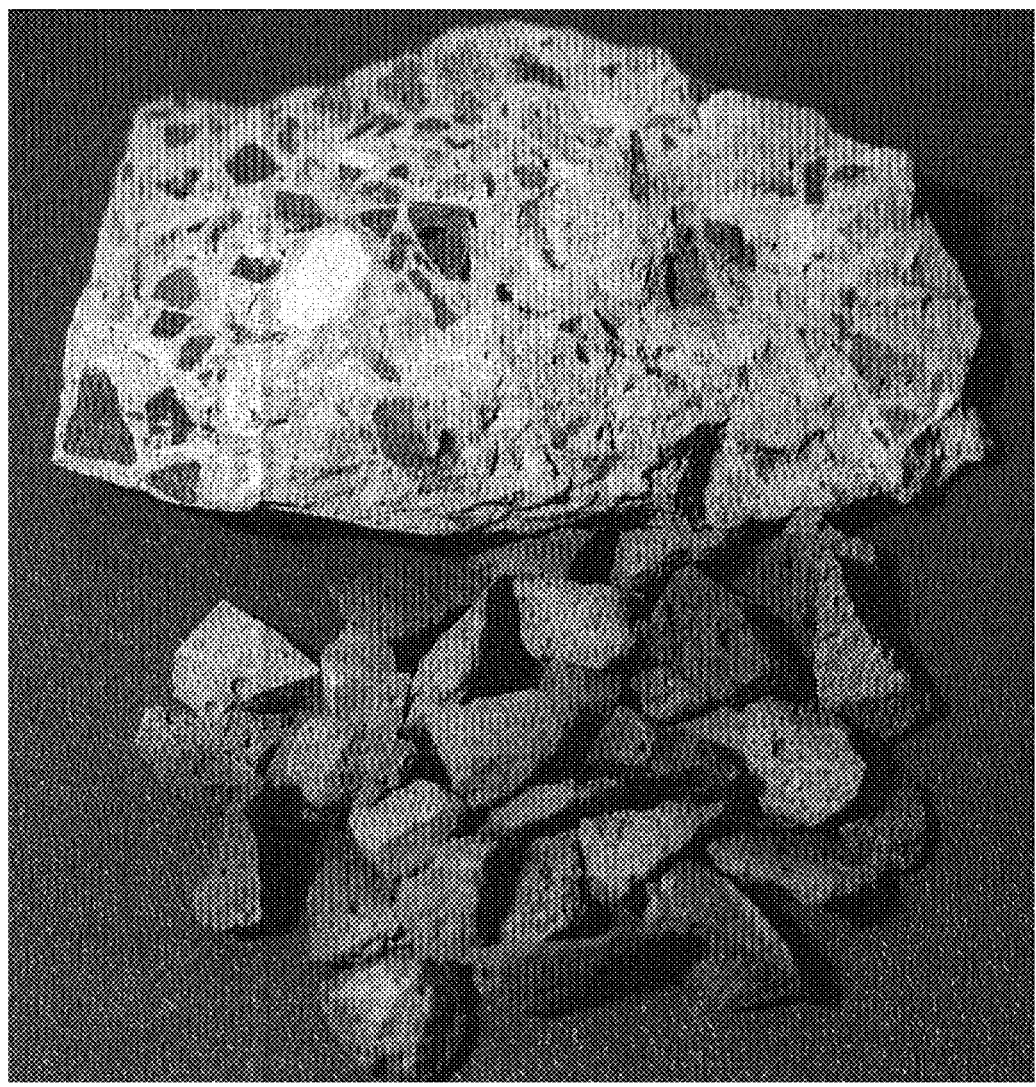
FIG. 3 is a photograph of the fractured and split faces of concrete including the fly ash aggregate of the present invention depicted in FIG. 1.
Figure 4:
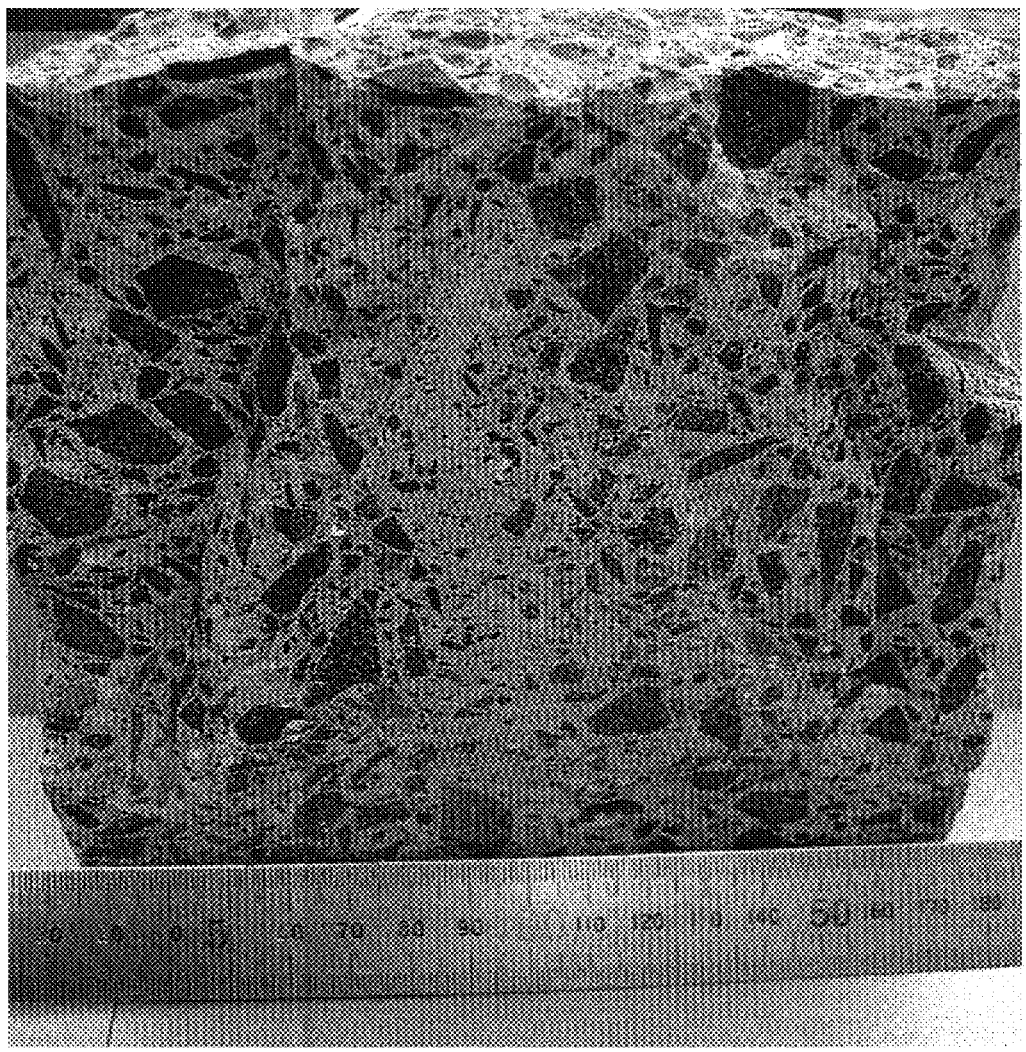
FIG. 4 is a photograph of the fractured and split faces of concrete including the fly ash aggregate depicted in FIG. 2.
Figure 5:
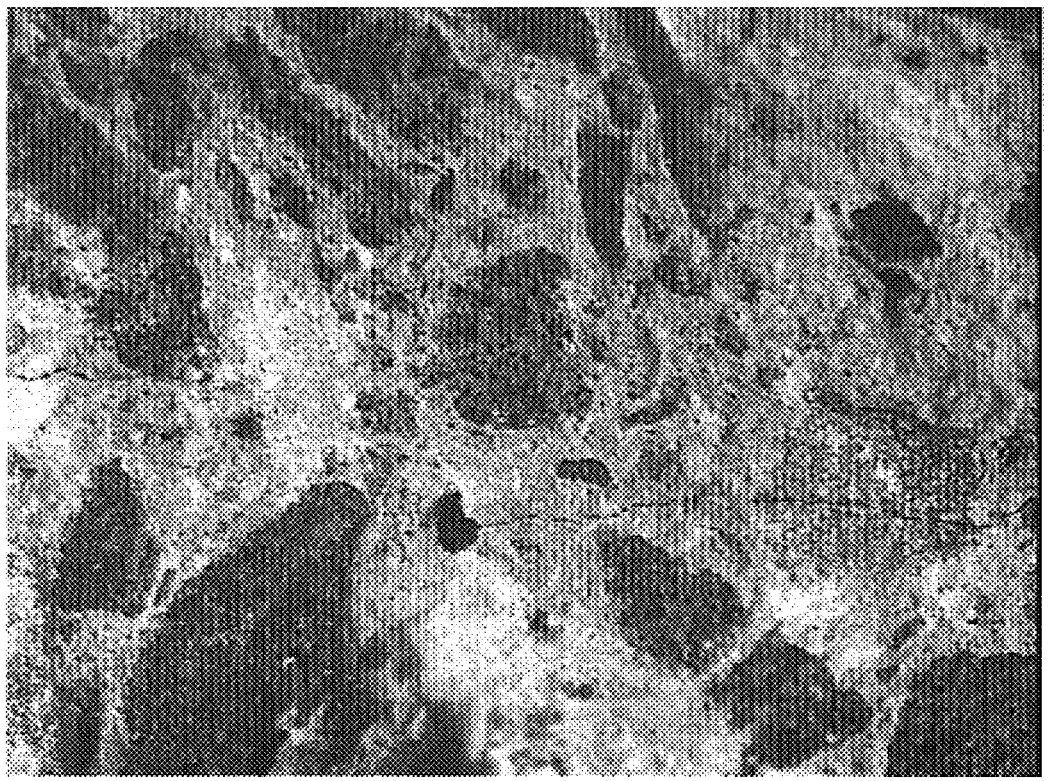
FIG. 5 is a photograph of a microscopic image (low magnification) of a fractured surface of concrete including fly ash aggregate of the present invention, illustrating the tight interlocking of the fly ash aggregate with the mortar-cementitious matrix of the concrete.
Figure 6:
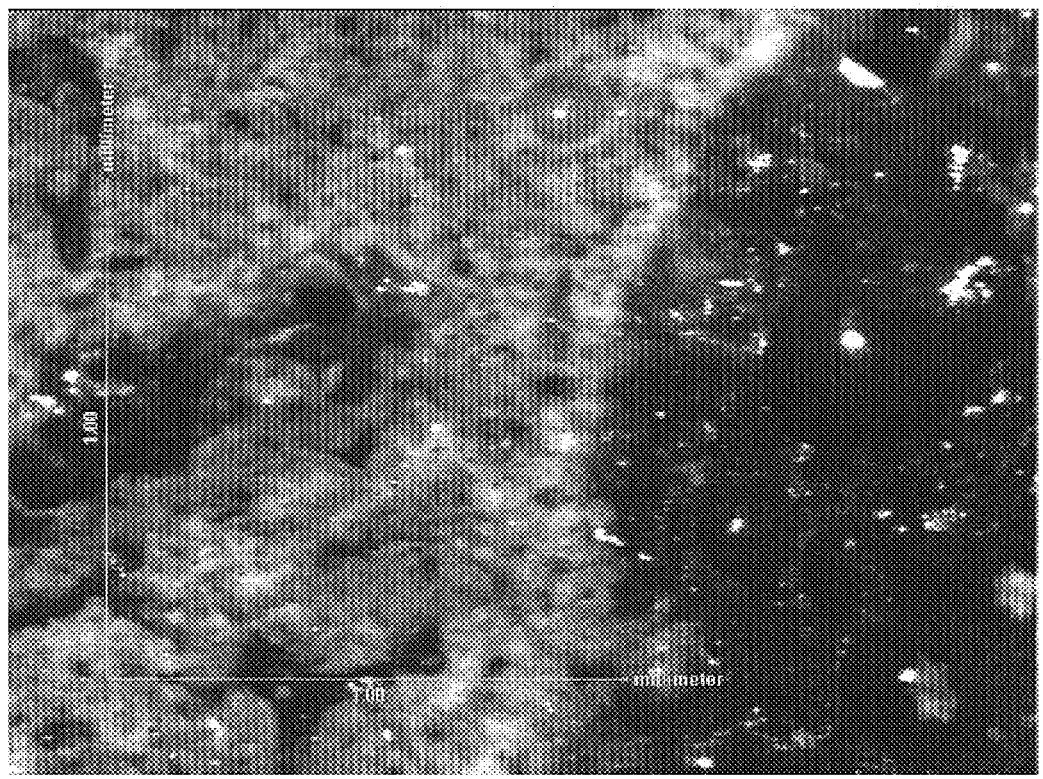
FIG. 6 is a close up photograph of the surface of FIG. 5 which concentrates on the boundary between the fly ash aggregate and the mortar-cementitious matrix (the aggregate is on the right hand side and the matrix on the left hand side of the photograph).

FIGS. 3 and 4 depict fractured and split faces of concrete including the respective fly ash aggregates of the preceding two examples. These illustrations together with the relatively low magnification photograph of FIG. 5 clearly illustrate the angular shape of the fly ash aggregate and its tight interlocking with the mortar-cementitious paste matrix of the concrete. FIG. 6 is a close-up image of the surface of FIG. 5 which concentrates on the boundary between the aggregate and the cement-mortar matrix. This close-up image clearly shows the tight interlock and the absence of cracks in the aggregate and the cement-mortar matrix interface shown on the right and left hand sides, respectively. The shiny bubble-like objects that appear mainly in the aggregate surface are semi-spherical holes or craters that are the traces of air/vapour bubbles which existed in the fly ash briquette prior to its crushing.

Figure 7:
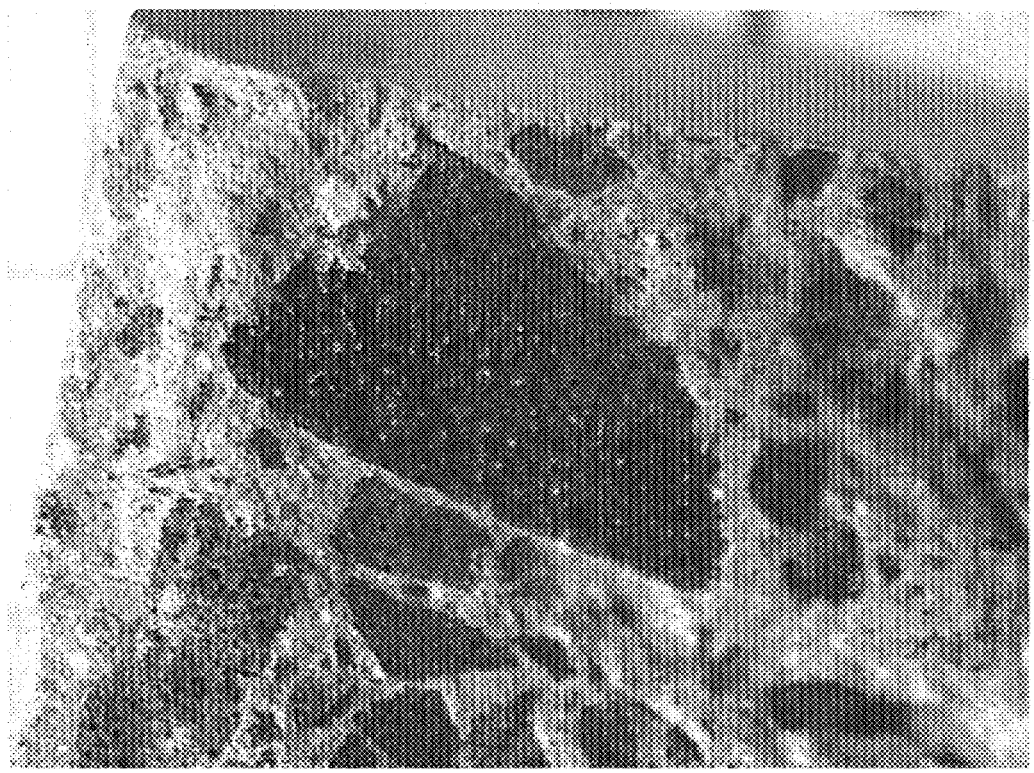
FIG. 7 is a photograph showing part of another piece of the fractured surface of concrete including fly ash aggregate of the present invention (the fly ash aggregate is the darker regions).

FIG. 7 is yet another photograph showing part of another piece of the fractured surface of concrete including the fly ash aggregate (darker regions) shown in their different sizes. Although the magnification of this photograph is low the numerous air bubble traces in the surface of the aggregate are still visible. Furthermore, the angular shape and tight interlock of the fly ash aggregate with the matrix of the concrete is readily apparent.

Figure 8:
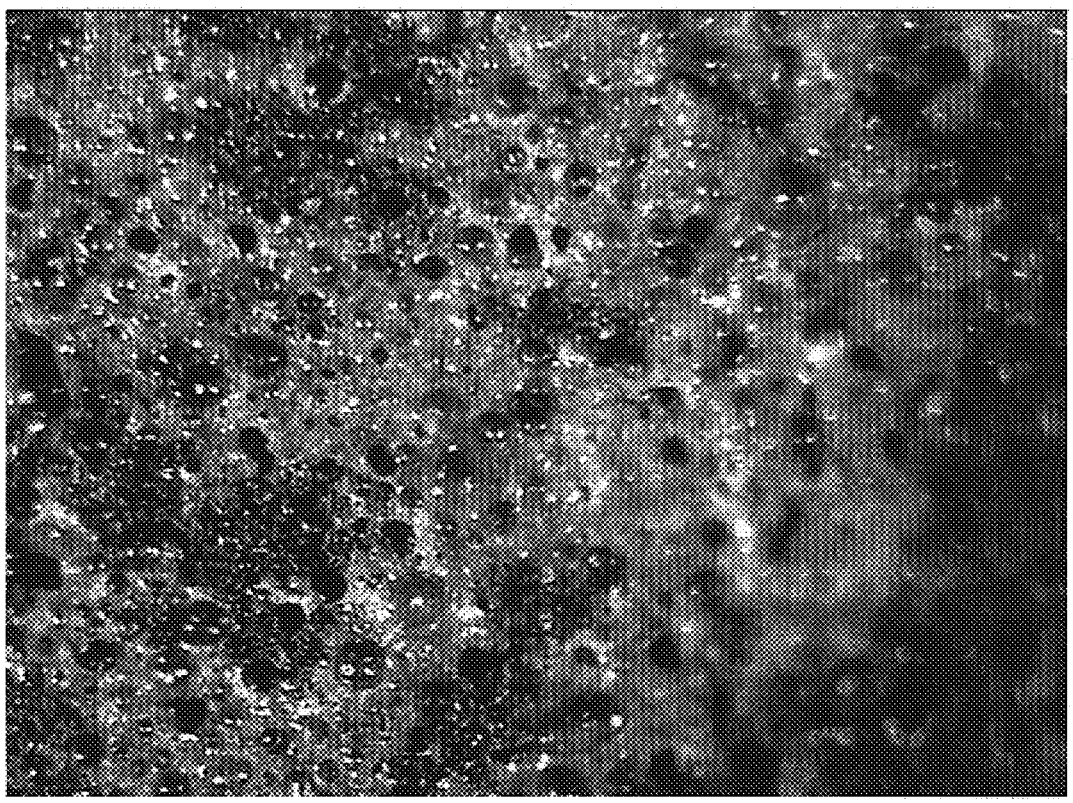
FIG. 8 is a closeup photograph of the surface of a fly ash aggregate of the present invention, showing the cratered surface of the fly ash aggregate.
Figure 9:
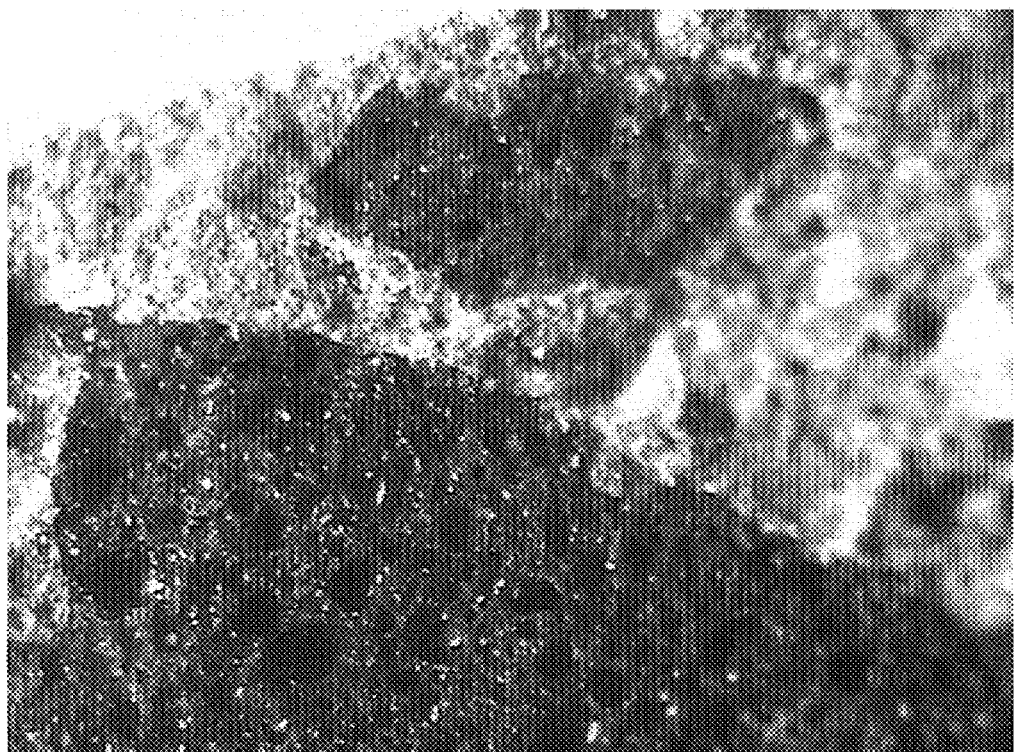
FIG. 9 is a close up photograph of part of the fractured surface of concrete including fly ash aggregate of the present invention, showing the interface between the fly ash aggregate and the mortar-cementitious matrix.
Figure 10:
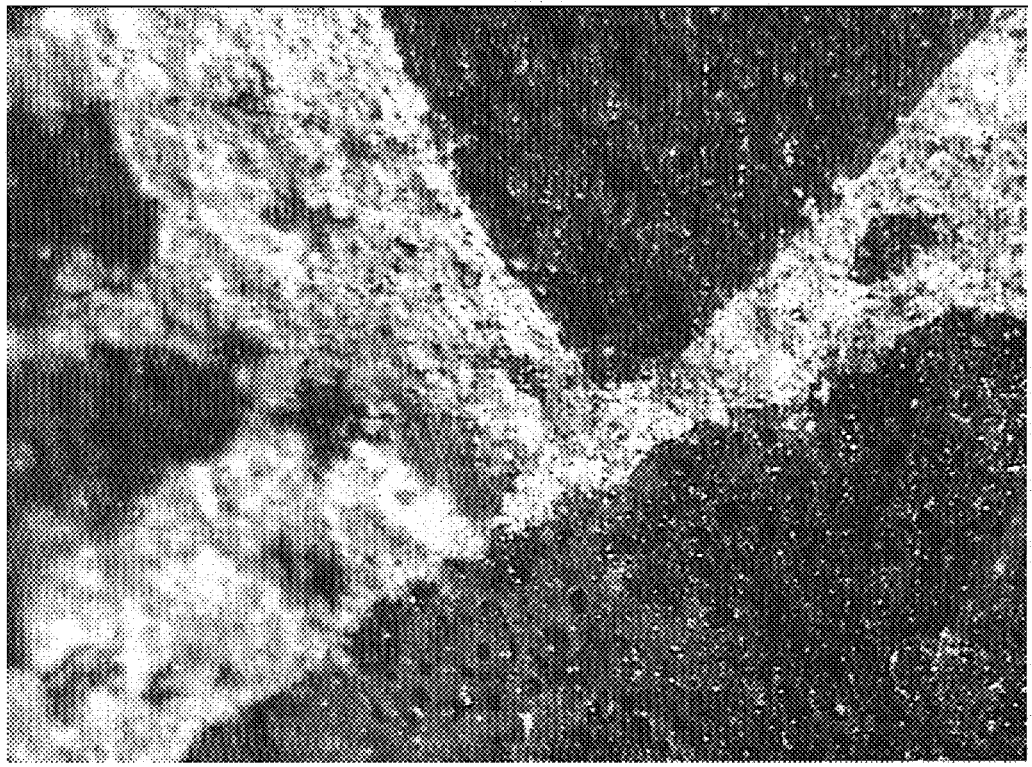
FIG. 10 is a close up photograph of part of the fractured surface of concrete including fly ash aggregate of the present invention, showing the interface between the fly ash aggregate and the mortar-cementitious matrix.

FIGS. 8 to 10 further illustrate the cratered surface of the fly ash aggregate and its interlocking with the matrix of the concrete. The photograph of FIG. 8 most clearly shows the impressions of what previously are bubble holes in the fly ash briquette. FIG. 9 shows the tight uncracked interface between the aggregate edges and the matrix whereas FIG. 10 shows the angular edges of the fly ash aggregate and its interlock with the matrix at the aggregate/matrix interface.

The inclusion of the superplasticiser in the preceding examples of the invention reduced the amount of water required to blend the fly ash slurry whilst allowing ease of workability to form a cohesive dough that could be formed and compacted in moulds. Furthermore, the air bubble traces or craters subsequently formed in the fly ash particles are understood to be the result of either or both of the following mechanisms:

i) the craters are the result of entrained bubbles that occur because of the use of the plasticiser;

ii) the dispersant effect of the plasticiser is such that the water is held in the form of droplets that allow the fly ash particles to roll on them and when dried the droplets evaporate leaving behind their traces as air bubbles.

It is understood that the plasticiser through its dispersant and hydrophobic effect caused the formation of air bubbles in the dried product. These bubbles may have been caused directly or indirectly by the inclusion of the plasticiser.

The use of lightweight aggregate in concrete has many advantages including:

(a) reduction of dead load that may result in reduced footings sizes and significant reduction in reinforcement, (b) lighter and smaller precast elements needing smaller and less expensive handling and transporting equipment, (c) a reduction in the sizes of columns and slab and beam dimensions that result in larger space availability, (d) a high thermal insulation, and (e) enhanced fire resistance.

Furthermore, certain structures, and in particular offshore structures, which are mostly used for oil production require lightweight elements which can be towed easily and have the greatest buoyancy.

Perhaps the most significant potential advantage of the use of lightweight aggregates for concrete and building in general is the environmental value. When the raw materials needed for lightweight production are derived from industrial by-products, the environment and economy of the producing locality and country are deemed to benefit. Already, stringent environmental limitations are imposed on mining of natural aggregates in various parts of the world. One of the more important of the industrial by-products, if not the most important, is fly ash. This application of fly ash in producing aggregate results in benefits to the community and the building industry including:

I. efficient recyclable disposal of the fly ash,

II. assisting to conserve the natural and very scarce materials of coarse aggregates and sand, III. sparing the countryside, river beds and beaches from the scarring and damaging activities of aggregate mining, IV. producing aggregates much lighter than the natural aggregates which results in the production of significantly lighter concrete, V. taking advantage of the pozzolanic activity inherent of fly ash to enhance strength and bond of matrix to aggregate, in addition to much improved durability, and VI. establishing an industry with export potential specially to countries where natural aggregates are depleted or, are of extremely inferior quality as in the oil rich Middle East states.

Reinforced concrete structures in coastal areas and offshore structures are required to resist chlorides and sulphates laden seawater which bring about the grave dangers of chloride initiated corrosion of the reinforcement and sulphate ion attack on the concrete. The fly ash aggregates of the described embodiments of the invention having low absorption capacity resist the entry of chlorides, sulphate ions and other deleterious material which may otherwise for example result in corrosion of the reinforcement. Also, because many of the offshore structures are situated in cold regions, frost attack is another serious deteriorating factor that must be resisted. In addition, the possibility of exposure to hydrocarbon fire is present because of the structures' functions. It is recognised that the use of lightweight aggregates derived from fly ash such as those described results in significant improvement in the resistance of concrete to the deleterious effects mentioned above.

Now that exemplary embodiments of the present invention have been described in some detail it will be apparent to those skilled in the art that the method of forming a lightweight fly ash aggregate together with the aggregate itself has at least the following advantages:

I. the fly ash aggregates of the invention are far superior to previously known lightweight aggregates including the LYTAG;

II. concrete made from the fly ash aggregates of the invention are lightweight, possess low porosity, high strength and low shrinkage;

III. concretes of the fly ash aggregate of the invention are superior to traditional normal weight concrete without having to increase the content of cement and thus a substantial economical and environmental benefit is achieved;

IV. concrete including the fly ash aggregate of the invention has comparable workability to concretes including prior art aggregates.

Those skilled in the art will appreciate that the invention described herein is susceptible to variations and modifications other than those specifically described. For example, the embodiment described may vary where crushing alone without subsequent sizing is adequate in providing the selected particle size range. The scope of the invention is also to extend to one or more of the important aspects of the overall process, for example the methodology relating to the forming of the fly ash slurry or dough, or the forming of the fly ash briquettes alone.

All such variations and modifications are to be considered within ambit of the present invention the nature of which is to be determined from the foregoing description.

What is claimed is:

1. A method of forming a lightweight fly ash aggregate, said method comprising the steps of:

blending fly ash together with a plasticiser and a reduced quantity of water to produce a fly ash slurry or dough;

forming the fly ash slurry or dough into a fly ash briquette;

heating the fly ash briquette to effectively cure the fly ash slurry or dough from which the fly ash briquette is derived;

firing the fly ash briquette to sinter the fly ash; and crushing the fly ash briquette to provide the lightweight fly ash aggregate.

2. A method as defined in claim 1 further comprising the step of sizing the fly ash aggregate according to a predetermined particle size range.

3. A method as defined in claim 1 wherein the plasticiser is a superplasticiser.

4. A method as defined in claim 1 wherein the volume (I) of the plasticiser to the weight (kg) of the fly ash is between about 0.1 to 5%.

5. A method as defined in claim 1 wherein the reduced volumetric quantity (I) of water to the weight (kg) of the fly ash is less than about 35%.

6. A method of forming a fly ash briquette, said method comprising the steps of:

heating the fly ash briquette at between about 40 to 110° C. to effectively cure the fly ash slurry or dough from which the fly ash briquette is derived; and then firing the fly ash briquette at around 1300° C.

7. A method as defined in claim 6 wherein the curing of the fly ash slurry or dough is effected at a controlled level of humidity.

8. A method as defined in claim 6 further comprising the step of compacting or compressing the fly ash slurry or dough prior to curing.

9. A method of forming lightweight fly ash particles, said method comprising crushing a fly ash briquette to provide the lightweight fly ash particles.

10. A method as defined in claim 9 wherein the step of crushing the fly ash briquette provides said fly ash particles having irregular or angular shapes.

11. A method as defined in claim 9 further comprising the step of sizing the fly ash particles according to a predetermined particle size range.

12. A method as defined in claim wherein the sizing is effected by screening of the fly ash particles.

13. A method as defined in claim 11 wherein the predetermined particle size range covers fly ash particles of a size from between about 75 μm to 30 mm.

14. A lightweight fly ash aggregate for concrete production, formed by the method of claim 1.

15. A fly ash aggregate as defined in claim 14 wherein the fly ash aggregate has a water absorption capacity as measured over 24 hours of less than 10%.

16. A fly ash aggregate as defined in claim 15 wherein the absorption capacity is between 2 to 5%.

17. A fly ash aggregate as defined in claim 14 wherein said aggregate is of a predetermined particle size range.

18. A fly ash aggregate as defined in claim 17 wherein the predetermined particle size range covers fly ash particles of a size about 75 μm to 30 mm.

19. A fly ash aggregate as defined in claim 17 wherein particle size range is between 75 μm to 12 mm.

20. A method as defined in claim 1 wherein the curing of the fly ash slurry or dough is effected at a controlled level of humidity.

21. A method as defined in claim 1 wherein the fly ash briquette is heated at between about 40 to 110° C. for one to four days to effectively cure the fly ash slurry or dough, and wherein the fly ash briquette is fired at around 1300° C.

22. A method as defined in claim 1 further comprising the step of compacting or compressing the fly ash slurry or dough prior to curing.

23. A method as defined in claim 6 wherein the fly ash briquette is heated at between about 40 to 100° C. for a period of one to four days to effectively cure the fly ash slurry or dough.

* * * * *

UNITED STATES PATENT AND TRADEMARK OFFICE
CERTIFICATE OF CORRECTION

PATENT NO. : 6,802,896 B2
DATED : October 12, 2004
INVENTOR(S) : Kayali et al.

It is certified that error appears in the above-identified patent and that said Letters Patent is hereby corrected as shown below:

Column 14,
Line 29, should read as follows: -- A method as defined in claim 11 wherein the sizing is effected by screening of the fly ash particles. --

Signed and Sealed this

Fifth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 6,802,896 B2
DATED : October 12, 2004
INVENTOR(S) : Obada Kayali and John Shaw It is certified that error appears in the above-identified patent and that said Letters Patent is hereby corrected as shown below:

Column 14,
Lines 1 and 5, replace "(I)" with -- (l) --.

Signed and Sealed this

Second Day of May, 2006

JON W. DUDAS
*Director of the United States Patent and Trademark Office*